(12) United States Patent
Wetherill et al.

(10) Patent No.: US 11,478,732 B2
(45) Date of Patent: Oct. 25, 2022

(54) FILTER EFFICENCY OF A FLUID FILTER

(71) Applicant: IoT Diagnostics, Cincinnati, OH (US)

(72) Inventors: Rex Wetherill, Cincinnati, OH (US);
Jeremy Drury, Cincinnati, OH (US);
Jon Prescott, Lexington, KY (US)

(73) Assignee: IoT Diagnostics, Cincinnati, OH (US)

( * ) Notice: Subject to any disclaimer, the term of this patent is extended or adjusted under 35 U.S.C. 154(b) by 263 days.

(21) Appl. No.: 16/675,929

(22) Filed: Nov. 6, 2019

(65) Prior Publication Data

US 2020/0139276 A1    May 7, 2020

Related U.S. Application Data

(60) Provisional application No. 62/756,271, filed on Nov. 6, 2018.

(51) Int. Cl.
*B01D 35/143* (2006.01)
*G01N 15/08* (2006.01)

(52) U.S. Cl.
CPC ..... *B01D 35/1435* (2013.01); *G01N 15/0806* (2013.01); *B01D 2201/54* (2013.01); *G01N 2015/084* (2013.01)

(58) Field of Classification Search
CPC .. B01D 35/14; B01D 35/143; B01D 35/1435; B01D 2201/54; G01N 15/08; G01N 15/0806; G01N 2015/084; G01F 1/34
See application file for complete search history.

(56) References Cited

U.S. PATENT DOCUMENTS

| | | | |
|---|---|---|---|
| 6,504,474 B1 | 1/2003 | Goodnight et al. | |
| 6,736,980 B2 * | 5/2004 | Moscaritolo | B01D 37/046 210/90 |
| 6,979,361 B2 * | 12/2005 | Mihayiov | B01D 46/0086 96/417 |
| 7,174,273 B2 | 2/2007 | Goldberg | |

(Continued)

FOREIGN PATENT DOCUMENTS

CN    108287127 A    7/2018

OTHER PUBLICATIONS

International Search Report; International Searching Authority; International Application No. PCT/US2019/060065; dated Jan. 27, 2020; 2 pages.

(Continued)

*Primary Examiner* — Nguyen Q. Ha
(74) *Attorney, Agent, or Firm* — Taft Stettinius & Hollister LLP

(57) ABSTRACT

Systems and methods determine a filter efficiency of a fluid filter. A characteristic of fluid flow of a fluid is monitored at a first point and at a second point on a flow path of a fluid filter. A particle absorption level of the fluid filter is determined that is a difference in the characteristic of the fluid flow at the first point and the second point. The particle absorption level of the fluid filter is at a particle absorption saturation level based on the difference in the characteristic of the fluid flow at the first point and the second point. The particle absorption saturation level is an indicator that the particles retained by the fluid filter is decreased and replacement of the fluid filter is required to increase the particles retained by the fluid filter to be above the particle absorption saturation level.

20 Claims, 4 Drawing Sheets

(56) References Cited

U.S. PATENT DOCUMENTS

| | | | |
|---|---|---|---|
| 7,922,914 B1 * | 4/2011 | Verdegan | B01D 37/046 |
| | | | 702/50 |
| 9,243,990 B2 * | 1/2016 | Durant | F16K 37/0091 |
| 9,849,412 B2 * | 12/2017 | Colotte | B01D 35/143 |
| 9,983,114 B2 * | 5/2018 | Henderson | F02M 35/09 |
| 10,794,408 B2 * | 10/2020 | Baldys | F15B 19/00 |
| 2018/0207648 A1 | 7/2018 | Stull et al. | |

OTHER PUBLICATIONS

Written Opinion of the International Searching Authority, International Searching Authority; International Application No. PCT/US2019/060065; dated Jan. 27, 2020; 10 pages.

Pall Corporation, Filtration, e-Book, Sep. 2016, 41 pages, printed in the United Kingdom.

* cited by examiner

FILTER EFFICENCY OF A FLUID FILTER

FIELD OF THE INVENTION

The present invention relates generally to filter circuits and, more particularly, to generating the operating condition of a filter in the fluid circuit.

BACKGROUND OF THE INVENTION

Industrial systems often times utilize fluid power systems to perform work, such as, to run hydraulic motors or to extend and retract cylinders in various manufacturing or production environments, for example. These fluid power systems include fluid filters that are used to remove an excess of particles included in the fluid, such as hydraulic fluid, as the fluid flows throughout the fluid power system in executing the desired work. In removing the excess of particles from the fluid by the fluid filter as the fluid flows throughout the fluid power system, the efficiency in which the fluid power system operates increases as well as prevents and/or slows down the mechanical wear of several of the components of the fluid power system. To filter the fluid, the fluid filter includes a material with pore sizes that captures the particles included in the fluid as the fluid flows through the fluid filter thereby preventing the particles from flowing through the fluid power system and possibly causing damage. However, a failure to adequately remove the particles from the fluid may result in the components of the fluid power system to eventually fail if the wear from the particles included in the fluid is left unchecked.

Failure of the fluid power system can have catastrophic consequences. For example, if a pump included in the fluid power system abruptly fails, substantial debris can be introduced into the system causing damage to downstream components. In addition, catastrophic failures can result in substantial disruption of the manufacturing process. In view of the consequences of failure in components of the fluid power system, it is desirable to replace a fluid filter that is clogged with particles and is thus no longer adequately removing the particles from the fluid with a new fluid filter that has the capacity to adequately capture the particles from the fluid. In replacing the fluid filter when the fluid filter is no longer adequately removing the particles from the fluid may prevent the components of the fluid power system from failing catastrophically, thus avoiding a major disruption in production.

One problem, however, is how to objectively determine when to replace the fluid filter. Generally, preventive maintenance schedules are developed from past experience and are subjective. Because fluid filter wear cannot be easily monitored during operation, the decline in the performance of the fluid filter to adequately remove the particles from the fluid may not be easily predicted. In this regard, the pressure of the fluid filter continues to increase as the fluid filter continues to accumulate particles as the fluid flows through the fluid filter. The pressure of the fluid filter may continue to increase as the particles continue to accumulate in the fluid filter as the fluid struggles to flow through the fluid filter with the increased amount of particles captured by the fluid filter. By sensing a pressure change in the fluid before the fluid enters the fluid filter and then after the fluid enters the fluid filter, an estimate of the remaining fluid filter life may be made. In situations where, the pressure change in the fluid exiting the fluid filter reaches a predetermined threshold, removal of the fluid filter for a new fluid filter may be scheduled.

SUMMARY OF THE INVENTION

The present invention overcomes the foregoing and other shortcomings and drawbacks of known fluid filter monitoring devices for use in fluid circuits. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a computer implemented method determines a filter efficiency of a fluid filter. According to one aspect of the present invention, a characteristic of fluid flow of a fluid is monitored at a first point and a second point on a flow path of a fluid filter. The flow path is a path that the fluid flows through the fluid filter. A particle absorption level of the fluid filter is determined that is a difference in the characteristic of the fluid flow at the first point and the second point. The particle absorption level indicates a quantity of particles that is retained by the fluid filter as the fluid flows through the fluid filter along the flow path. The particle absorption level of the fluid filter is determined as to when the particle absorption level is at a particle absorption saturation level based on the difference in the characteristic of fluid flow at the first point and the second point. The particle absorption saturation level is an indicator that the quantity of particles retained by the fluid filter as the fluid flows through the fluid filter is decreased and replacement of the fluid filter is required to increase the quantity of particles retained by the fluid filter to be above the particle absorption saturation level.

According to another aspect of the present invention, a system for determining a filter efficiency of a fluid filter includes a filter monitoring device and a filter computing device. The filter monitoring device is configured to monitor a characteristic of fluid flow of a fluid at a first point and at a second point on a flow path of a fluid filter. The flow path is a path that the fluid flows through the fluid filter. The filter computing device is configured to determine a particle absorption level of the fluid filter that is a difference in the characteristic of the fluid flow at the first point and the second point. The particle absorption level indicates a quantity of particles that is retained by the fluid filter as the fluid filter flows through the fluid filter along the fluid path. The filter computing device is also configured to determine when the particle absorption level of the fluid filter is at a particle absorption saturation level based on the difference in the characteristic of the fluid flow at the first point and the second point. The particle absorption saturation level is an indicator that the quantity of particles retained by the fluid filter as the fluid flows through the fluid filter is decreased and replacement of the fluid filter is required to increase the quantity of the particles retained by the fluid filter to be above the particle absorption saturation level.

The above and other objectives and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiments given below, serve to explain the principles of the invention.

DETAILED DESCRIPTION OF THE INVENTION

Figure 1:
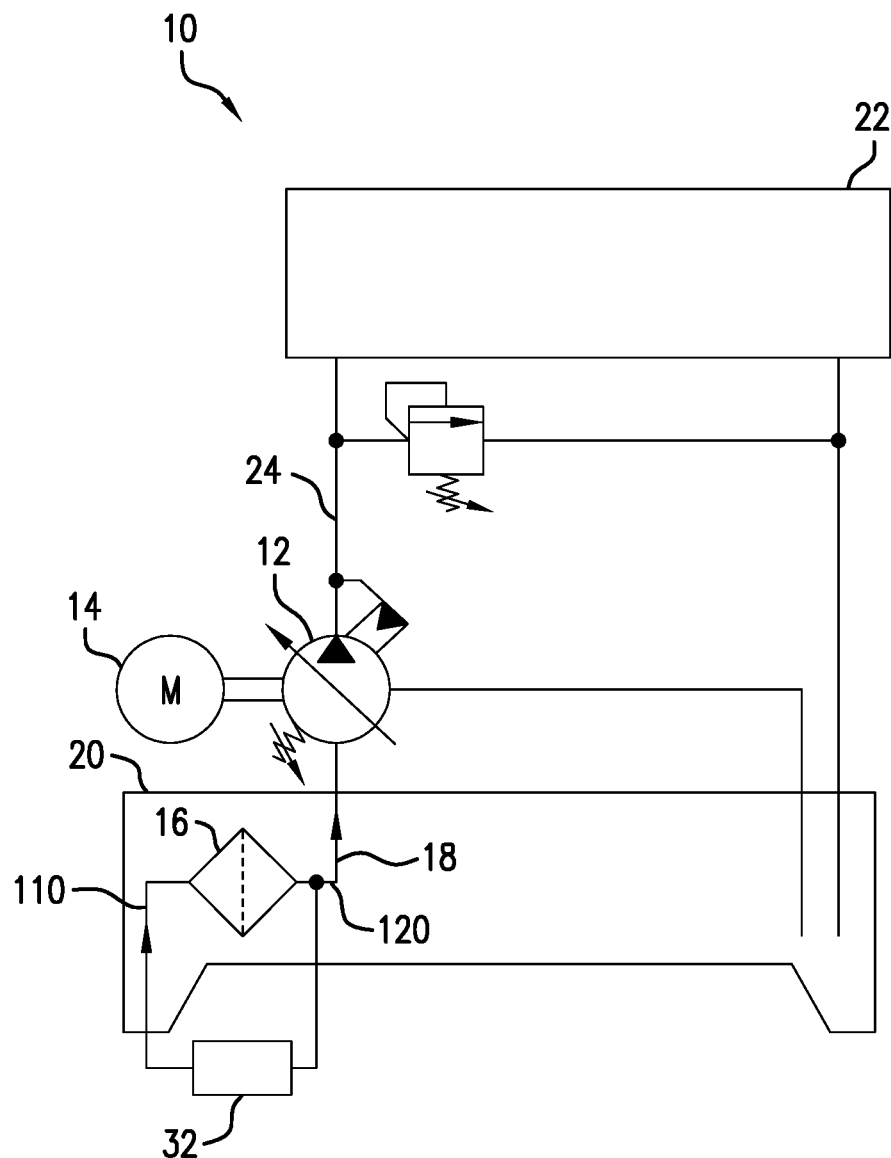
FIG. 1 is a schematic view of a fluid power system according to one embodiment of the invention.

In the Detailed Description herein, references to "one embodiment", "an embodiment", an "example embodiment", etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment of the present invention, Applicants submit that it may be within the knowledge of one skilled in the art to affect such feature, structure, or characteristic in connection with other embodiments of the present invention whether or not explicitly described.

Embodiments of the present invention may be implemented in hardware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed can be considered a module, and the term "module" shall be understood to include at least one software, firmware, and hardware (such as one or more circuit, microchip, or device, or any combination thereof), and/or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further components within a module can be in a single device or distributed among multiple devices in a wired or wireless manner.

The following detailed description refers to the accompanying drawings that illustrate exemplary embodiments of the present invention. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the present invention to the embodiments described below.

With reference to FIG. 1, an exemplary fluid power system 10 is depicted. In this example, the fluid power system 10 may include a variable speed hydraulic pump 12 powered by a motor 14. During operation, the pump 12 may draw fluid through a fluid filter 16 and suction line 18 from a tank 20. The fluid may flow from the tank 20 into an input port 110 of the fluid filter 16. The fluid filter 16 may then remove particles included in the fluid based on the mesh of pores and other components of the fluid filter 16 such that the particles are captured in the mesh of pores and other components of the fluid filter 16 and thereby removed from the fluid as the fluid propagates out of the fluid filter 16 via the output port 120.

The fluid filter 16 may then remove the particles from the fluid to protect the additional components of the fluid power system 10 from wear and/or damage caused by the particles flowing through those additional components via the fluid. For example, the fluid filter 16 may remove the particles from the fluid to protect the pump 12 that may pressurize the fluid for use by a machine 22 in fluid communication with the pump 12 via a main line 24. The pump 12 and the machine 22 may be valuable components of the fluid power system 10 in that the pump 12 and the machine 22 may execute the operations necessary to maintain the fluid power system 10 to complete the designated tasks, such as functioning on a manufacturing line. The fluid is pumped by the pump 12 and circulated through the machine 22 such that the machine 22 may execute the operations with the circulation of the fluid. Particles may be accumulated into the fluid as the fluid flows through the different components of the fluid power system 10. Such particles that accumulate in the fluid may significantly impact the operation of the components, such as the pump 12 and the machine 22, as the fluid flows through those components with the accumulated particles. Eventually, the particles may accumulate in the fluid to a point where the increased accumulation of the particles may trigger wear and/or damage to the components of the fluid power system 10 as the particles continue to accumulate.

The fluid filter 16 may retain particles and remove the particles from the fluid as the fluid flows through the fluid filter 16 to prevent the fluid from transporting the particles into the other components of the fluid power system 10, such as the pump 12 and the machine 22. As the fluid filter 16 retains the particles, the fluid filter 16 simply continues to retain additional particles as the fluid flows through the fluid filter 16. Typically, the fluid filter 16 does not discharge the retained particles to provide additional volume of the fluid filter 16 to continue to retain additional particles from the fluid. Rather, the fluid filter 16 simply continues to retain particles until the fluid filter 16 is clogged with particles thereby significantly decreasing the capability of the fluid filter 16 to adequately retain the particles from the fluid. In doing so, the fluid filter 16 captures less and less particles from the fluid as the fluid flows through the fluid filter 16 and the fluid then transports the particles throughout the other components of the fluid power system 10 thereby increasing the risk of the components, such as the pump 12 and the machine 22, of having a decrease in performance and/or enduring additional wear and/or damage.

The fluid filter 16 may have a particle absorption level that indicates a quantity of particles that is retained by the fluid filter 16 as the fluid flows through the fluid filter 16 along the flow path which is between the input port 110 of the fluid filter 16 and the output port 120 of the fluid filter 16. As the fluid filter 16 retains additional particles from the fluid as the fluid flows through the fluid filter, the particle absorption level of the fluid filter 16 may continue to increase. Typically, the fluid filter 16 may continue to adequately retain the particles from the fluid despite having the particle absorption level of the fluid filter 16 to continue to increase as the fluid filter 16 continues to retain particles from the fluid.

However, the fluid filter 16 may have a saturation point where the fluid filter 16 retains a quantity of particles from the fluid that quickly transitions the fluid filter 16 from adequately retaining the particles from the fluid to becoming saturated with particles clogged in the fluid filter 16 and that the fluid filter 16 is no longer adequately retaining the particles from the fluid. At that saturation point, the particle absorption level of the fluid filter 16 may reach a particle absorption saturation level that is an indicator that the quantity of particles retained by the fluid filter 16 as the fluid flows through the fluid filter 16 is decreased and replacement of the fluid filter 16 is required to increase the quantity of the particles retained by the fluid filter 16 to be above the particle absorption saturation level.

After the particle absorption saturation level of the fluid filter 16 is reached, the fluid filter 16 may no longer adequately remove the particles from the fluid as the fluid flows through the fluid power system 10. In doing so, the particles may continue to accumulate in the fluid and the fluid may transport the particles to the other components of the fluid power system 10 thereby increasing the risk to the other components, such as the pump 12 and the machine 22, of having a decrease in performance and/or enduring additional wear and/or damage. As noted above, the fluid filter 16 typically does not discharge the particles that retained by the fluid filter 16 as the fluid flows through the fluid filter 16 to provide additional capacity by the fluid filter 16 to continue to adequately retain the particles from the fluid to prevent the other components of the fluid power system 10 from suffering a decrease in performance and/or enduring additional wear and/or damage.

Thus, once the particle absorption saturation level of the fluid filter 16 is reached, replacement of the fluid filter 16 with a new fluid filter that has the capacity to adequately retain the particles of the fluid as the fluid flows through the new fluid filter to adequately prevent the other components of the fluid power system 10 from suffering a decrease in performance and/or enduring additional wear and/or damage is required. The only approach to decrease the particle absorption level from the particle absorption saturation level is to replace the fluid filter 16 that has reached the particle absorption saturation level with a new fluid filter with a significantly lower particle absorption level and thereby has the capacity to retain the particles from fluid to adequately prevent the other components of the fluid power system 10 from suffering a decrease in performance and/or enduring additional wear and/or damage.

In order to ensure that the fluid filter 16 does not reach the particle absorption saturation level, maintenance teams may incorporate preventative maintenance such that a schedule is implemented to change the fluid filter 16 with a new fluid filter on an ongoing basis. For example, the maintenance team may determine that changing the fluid filter 16 every 6 months with a new fluid filter to ensure that the particle count level of the fluid filter 16 does not reach the particle absorption saturation level thereby preventing the other components of the fluid power system 10 from suffering a decrease in performance and/or enduring additional wear and/or tear. However, the implementation of the scheduled change of the fluid filter 16 may often times result in a premature removal of the fluid filter 16. The fluid filter 16 may very well have additional time before the particle absorption level of the fluid filter 16 reaches the particle absorption saturation level.

In prematurely removing the fluid filter 16, additional costs with purchasing the new fluid filter to replace the fluid filter 16 as well as the maintenance costs with performing the fluid filter change as well as an impact on the performance of the fluid power system 10 should the fluid power system 10 be deactivated to perform the fluid filter change may prematurely trigger these additional costs and impact on performance. Further, if the fluid filter 16 continues to be removed prematurely during the schedule, these costs and impact on performance may be incurred significantly more as compared to if the fluid filter 16 were simply removed at the point when the particle absorption level of the fluid filter 16 reaches the fluid filter absorption saturation level.

For example, the fluid filter 16 may be scheduled to be changed every 4 months. The cost of changing the fluid filter 16 may be $1000 in addition to having a one-hour shutdown of the fluid power system 10 each time the fluid filter is to be changed. However, the particle absorption level of the fluid filter 16 does not reach the particle absorption saturation level until 6 months. The scheduled change of the fluid filter 16 to be every 4 months does ensure that the particle absorption level of the fluid filter 16 does not reach the particle absorption saturation level.

However, the fluid filter 16 actually has an additional 2 months before the particle absorption level reaches the particle absorption saturation level. In changing the fluid filter 16 prematurely every 4 months, $4000 of cost is incurred each year to change the fluid filter 16 as well as incurring 4 hours of shutdown time. However, in actuality, the fluid filter 16 is reaching the particle absorption saturation level every 6 months. In changing the fluid filter 16 when the particle absorption level actually reaches the particle absorption saturation level every 6 months, $2000 of cost is incurred each year to change the fluid filter as well as incurring 2 hours of shutdown time. Thus, significant cost as well as shutdown time may be saved should the fluid filter 16 be changed when the particle absorption level of the fluid filter 16 reaches the particle absorption saturation level.

Further, maintenance teams may simply fail to incorporate any type of schedule to change the fluid filter 16. In doing so, the particle absorption level of the fluid filter 16 may reach the particle absorption saturation level and may continue to operate at the particle absorption saturation level for a significant amount of time before ever being changed out for a new fluid filter to lower the particle absorption saturation level. In doing so, the particles may continue to increase in the fluid and the fluid power system 10 may operate for months with the particles continuing to increase with the fluid filter 16 at the particle absorption saturation level thereby causing the components of the fluid power system 10, such as the fluid pump 12 and the machine 22, to suffer a decrease in performance and/or enduring additional wear and/or damage.

However, maintenance teams may struggle to know when the particle absorption level of the fluid filter 16 reaches the particle absorption saturation level. The particle absorption level of the fluid filter 16 may be dynamic in that the amount of time that the particle absorption level of the fluid filter 16 reached particle absorption saturation level may vary significantly for the fluid filter 16. The significant variance in the particle absorption saturation level may depend on the fluid that flows through the fluid filter 16, the operation of the fluid power system 10, how often the fluid power system 10 operates and so on. For example, the particle absorption level of the fluid filter 16 may reach the particle absorption saturation level in 5 months for a first fluid filter and then may reach the particle absorption level in 6 months for a second filter with both the first fluid filter and the second fluid filter operating within the fluid power system 10.

In this regard and in one embodiment of the invention, a filter monitoring device 32 is connected to the input port 110 and the output port 120 of the fluid filter 16 to measure a characteristic of the fluid flow. Fluid flow incorporates how a fluid flows throughout the fluid power system 10, and in particular, how the fluid flows through the fluid filter 16. For example, a pressure change in which the fluid flows through the fluid filter as determined by the pressure of the fluid as measured at the input port and then the difference in the pressure of the fluid as measured at the output port 120. The pressure change in fluid flow may remain consistent for each cycle of the machine 22. The pressure change of the fluid flow at the input port 110 and the output port 120 of the fluid filter 16 is an indicator of the particle absorption level of the fluid filter 16. However, degradation in the performance of the fluid filter 16 may cause the pressure change of the fluid flow at the input port and the output port 120 of the fluid filter 16 to increase to a threshold level that is indicative that the fluid filter 16 has reached the particle absorption saturation level.

The characteristic of fluid flow may be an identifiable parameter of the fluid flow that may be measured by the filter monitoring device 32 and/or derived from other characteristics and/or combination of characteristics measured by the filter monitoring device 32. The filter monitoring device 32 may monitor one or more characteristics of the fluid as the fluid passes through the fluid filter 16. Characteristics of the fluid flow whether measured by the filter monitoring device 32 and/or derived from other characteristics measured by the filter monitoring device 32 may be indicative as to the performance of the fluid filter 16. As the performance of the flu id filter 16 degrades, the characteristics may provide an indication that the performance of the fluid filter 16 is degrading and/or to the rate in which the performance of the fluid filter 16 is degrading.

For example, the pressure change at the input port 110 and the output port 120 of the fluid as the fluid flows throughout the fluid power system 10 may be indicative as to the performance of the fluid filter 16. As the pressure change of the fluid as measured at the input port 110 and the output port 120 increases over a period of time as compared to the pressure change of the fluid when the fluid filter 16 is operating properly, such an extended increase of the pressure change may be indicative that the particle absorption level of the fluid pump 16 is reaching the particle absorption saturation level. The characteristics of fluid flow that may be monitored by the filter monitoring device 32 and/or derived from characteristics monitored by the filter monitoring device 32 may include but are not limited to the pressure change between the input port 110 and the output port 120, flow rate, volume, temperature, pump efficiency, viscosity, thermal properties, Reynolds number and/or any other type of characteristic that may be an identifiable parameter of the fluid that will be apparent to those skilled in the relevant art(s) without departing from the spirit and scope of the disclosure.

The filter monitoring device 32 may monitor the characteristic of the fluid flow at a first point and a second point on a flow path of the fluid filter 16. The flow path is a path that the fluid flows through the fluid filter 16. For example, the flow path includes the path of the fluid from the input port 110 of the fluid filter 16 through the fluid filter 16 and to the output port 120 of the fluid filter 16. As the fluid flows through the fluid filter 16, differences between the characteristic as monitored by the filter monitoring device 32 at the first point and then the second point may be indicative that the particle absorption level of the fluid filter 16 is reaching the particle absorption saturation level.

The fluid is circulated throughout the fluid power system 10 when driving the machine 22. The fluid filter 16 may retain particles from the fluid as the fluid flows through the fluid filter 16. The mesh of pores and other components of the fluid filter 16 may retain the particles in the fluid filter 16 such that the fluid may then flow throughout the fluid power system 10 with the particles removed from the fluid. As the fluid filter 16 continues to retain the particles, the pressure change between the input port 110 and the output port 120 of the fluid filter 16 may continue to increase. The increase in the quantity of the particles retained by the fluid filter 16 may result in less volume available for the fluid to flow through the fluid filter 16 as the mesh of pores of the fluid filter 16 become more clogged with the particles retained by the fluid filter 16.

Thus, as the fluid filter 16 continues to retain an increased quantity of particles, the fluid flows less freely through the fluid filter 16 thereby resulting in the pressure of the fluid that is struggling to flow through the clogged mesh of pores of the fluid filter 16 to increase. Thus, the pressure difference of the fluid between the input port 110 and the output port 120 of the fluid filter 16 continues to increase as the fluid filter 16 retains an increased quantity of particles. Eventually, the fluid filter 16 may retain an increased quantity of particles to the point where the fluid filter 16 has reached the particle absorption saturation level and may no longer retain particles included in the fluid.

Thus, monitoring the pressure change of the fluid flow at the input port 110 and the output port 120 of the fluid filter 16 may enable the particle absorption level of the fluid filter 16 to be determined. The filter monitoring device 32 may also monitor any characteristic of the fluid flow at a first point and a second point positioned anywhere on the flow path of the fluid power system 10 that may enable the particle absorption level of the fluid filter 16 to be determined that will be apparent to those skilled in the relevant art(s) without departing from the spirit and scope of the disclosure.

Differences in the pressure at the input port 110 and the output port 120 of the fluid filter 16 that exceeds a saturation pressure change threshold for the fluid filter 16 may indicate that the particle absorption level of the fluid filter 16 may have reached the particle absorption saturation level which also indicates that the fluid filter 16 may no longer be adequately retaining particles from the fluid. In an embodiment, the particle absorption saturation level of the fluid filter 16 is reached when the pressure change of the fluid flow exceeds the saturation pressure change threshold. As noted above, typically the fluid filter 16 does not discharge the particles retained by the fluid filter 16 in order to increase the quantity of particles that the fluid filter 16 may continue to retain the particles from the fluid. Thus, the pressure change between the input port 110 and the output port 120 of the fluid filter may continue to increase as the fluid filter 16 continues to retain particles resulting in the fluid triggering an increase in pressure as the fluid attempts to push through the clogged fluid filter 16. As a result, an increase in the pressure change between the first port 110 and the second port 120 of the fluid filter 16 may be indicative that the particle absorption level of the fluid filter 16 is also increasing and approaching the saturation pressure change threshold.

In an embodiment, the filter monitoring device 32 may include pressure transducers such that a first pressure transducer is positioned at the input port 110 of the fluid filter 16 and a second pressure transducer is positioned at the output port 110 of the fluid filter 16 and the pressure change may be determined from the difference in the pressure detected by the first pressure transducer and the pressure detected by the second transducer. In an embodiment, the filter monitoring device 32 may include a pressure transducer that is scaled for a particular output range to determine the pressure change of the fluid between the input port 110 and the output port of the fluid filter 16. In an embodiment, the filter monitoring device 32 may include a pressure switch that may have a particular burst strength such that the pressure switch triggers when pressure of the fluid at the input port 110 increases due to the mesh of pores of the fluid filter 16 being clogged. The filter monitoring device 32 may include any type of pressure measuring devices and/or combination thereof that may adequately determine when the pressure change of the fluid filter 16 has reached the saturation pressure change threshold that will be apparent to those skilled in the relevant art(s) without departing from the spirit and scope of the disclosure.

The filter monitoring device 32 may monitor any type of fluid whether the fluid be liquid and/or gas that may flow through the filter monitoring device 32 such that the particle absorption level of the fluid may be determined. The fluid may include but is not limited to oil, lubricants, air, blood and/or any other type of fluid that may be liquid and/or gas that may flow through the fluid filter 16 that will be apparent to those skilled in the relevant art(s) without departing from the spirit and scope of the disclosure.

Further the fluid power system 10 is an example system that may incorporate the flow of fluid to operate as well as including a fluid filter 16 to retain particles from the fluid as the fluid flows through the fluid filter 16. However, the filter monitoring device 32 may be incorporated into any type of fluid system that may incorporate the flow of fluid to operate as well as the fluid filter 16 to retain particles from the fluid as the fluid flows through the fluid filter 16. For example, the filter monitoring device 32 may be incorporated into industrial lubrication systems, hydraulics systems, air filtration systems, process filter systems, blood filter systems and/or any other type of system that may incorporate fluid flow to operate as well as the fluid filter 16 that will be apparent to those skilled in the relevant art(s) without departing from the spirit and scope of the disclosure.

Figure 2:
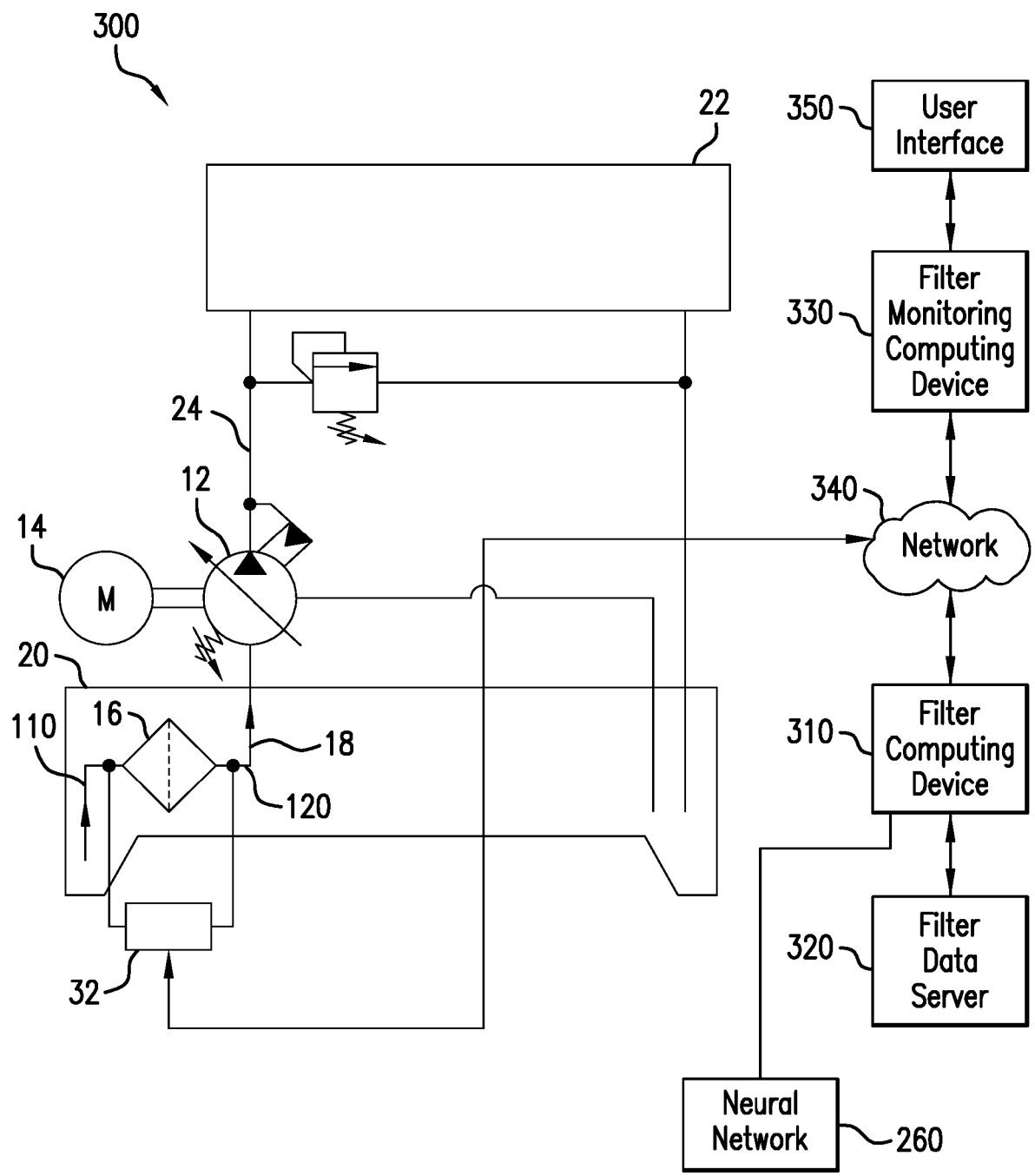
FIG. 2 is schematic view of the filter computing configuration according to one embodiment of the invention.

FIG. 2 illustrates a filter computing configuration 300 in which embodiments of the present invention, or portions thereof, may be implemented. The filter computing configuration 300 includes the fluid power system 10 as discussed in detail in FIG. 1, a filter computing device 310, a filter data server 320, a filter monitoring computing device 330, a neural network 260 and a network 340. The filter monitoring computing device 330 includes a user interface 350.

In one embodiment of the present invention, the filter computing device 310 may communicate with the filter monitoring device 32 to obtain filter data generated from the monitoring of the characteristics of fluid flowing through the fluid filter 16 by the filter monitoring device 32. The filter computing device 310 may then analyze the filter data to generate different types of analytics of the fluid filter 16, such as whether a characteristic has exceeded a threshold, that provide insight that is easily understandable by a user as to the performance of the fluid filter 16. The filter computing device 310 may then communicate the analytics of the fluid filter 16 to a filter monitoring computing device 330 that is operated by the user so that the user may monitor the performance of the fluid filter 16 via the analytics provided to the user via the filter monitoring computing device 330.

The filter monitoring device 32 includes a microprocessor, a memory and a network interface and may be referred to as a computing device or simply "computer". In one embodiment of the present invention, multiple modules may be implemented on the same computing device. Such a computing device may include software, firmware, hardware, or a combination thereof. Hardware can include but is not limited to, a microprocessor and/or a memory.

As the filter monitoring device 32 monitors the filter data for each characteristic of the fluid flow of the fluid power system 10, the filter monitoring device 32 may store the filter data in the filter data server 320 via the network 340. In an embodiment, each sensor that provides a signal to the filter monitoring device 32 may have an Internet Protocol (IP) address associated with each particular sensor. The filter monitoring device 32 may then stream the filter data that is measured by each sensor for each characteristic that is monitored by the filter monitoring device 32 via network 340 and then stores the filter data in the filter data server 320 based on the IP address of the filter data.

The filter computing configuration 300 may include one or more fluid power systems 10 that include one or more fluid filters 16 in which each fluid filter 16 is associated with a filter monitoring device 32 that is monitoring the fluid flow of the fluid filter 16. Thus, the filter computing configuration 300 may also include one or more filter monitoring devices 32 dependent on the quantity of fluid filters 16 included in the filter computing configuration 300. Each filter monitoring device 32 may then stream fluid data for each characteristic specific to the fluid flow of the fluid filter 16 that each filter monitoring device 32 is monitoring via network 340 to and store the filter data in the filter data server 320.

For example, the filter computing configuration 300 may include a large factory that includes hundreds of fluid filters 16. Each of the fluid filters 16 that are active in the factory are associated with a filter monitoring device 32 in which each individual filter monitoring device 32 monitors the filter data for each of the characteristics of the fluid flow for that specific fluid filter 16. Each of the filter monitoring devices 16 stream filter data for the characteristics specific to each individual fluid filter 16 and stores the filter data specific to each fluid filter 16 included in the factory in the filter data server 320.

The filter computing device 310 includes a processor, a memory, and a network interface, herein after referred to as a computing device or simply "computer". For example, the filter computing device 310 may include a data information system, data management system, web server, and/or file transfer server. The filter computing device 310 may also be a workstation, mobile device, computer, cluster of computers, set-top box or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display. The filter computing device 310 may be coupled to the filter monitoring device 32 and/or coupled to the fluid power system 10. The filter computing device 310 may also be positioned remote from the filter monitoring device 32 and/or the fluid power system 10.

As the filter computing device 310 generates the analytics of the fluid flow based on the filter data, the filter computing device 310 may query the filter data server 320 for the filter data associated with the characteristics that the filter computing device 310 is to generate based on the IP address associated with the filter data. For example, the filter computing device 310 may retrieve the filter data associated with the first pressure transducer and the second pressure transducer to generate the analytics of the pressure change between the first pressure transducer and the second pressure transducer based on the IP addresses associated with the filter data measured by the first pressure transducer and the second pressure transducer. The filter computing device 310 may generate the analytics of the fluid flow for each of the fluid filters 16 included in the filter computing configuration 300.

The filter monitoring computing device 330 includes a processor, a memory, and a network interface, herein after referred to as a computing device or simply "computer." For example, the filter monitoring computing device 330 may be a workstation, mobile device, computer, cluster of computers, or other computing device. In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display.

The user interface 350 may provide a user the ability to interact with the filter monitoring computing device 330. The user interface 350 may be any type of display device including but not limited to a touch screen display, a liquid crystal display (LCD) screen, and/or any other type of display that will be apparent from those skilled in the relevant art(s) without departing from the spirit and scope of the present disclosure.

The filter monitoring computing device 330 may be a computing device that is accessible to the user that is monitoring the performance of the fluid filter 16. The filter computing device 310 may stream the analytics to the filter monitoring computing device 330 via network 340 and the filter monitoring computing device 330 may display the analytics via the user interface 350. The filter computing device 310 may be a stationary computing device and positioned in an office in which the user may monitor the analytics provided by the filter computing device 310 for the fluid filter 16. The filter computing device 310 may also be a mobile device in which the user may be able to monitor the analytics for the pump 12 as the user changes locations.

The fluid monitoring computing device 330 may display the analytics via the user interface 350 streamed by the filter computing device 310 for each of the fluid filters 16 in which the filter computing device 310 has generated analytics. For example, the filter computing configuration 300 includes a factory with hundreds of fluid filters 16. The filter monitoring computing device 330 may display the analytics for each of the several fluid filters 16 included in the filter computing configuration 300 such that the user may monitor the performance of each of the fluid filters 16 simultaneously. The filter monitoring computing device 330 may also provide further analytics specific to a single fluid filter 16 included in the fluid computing configuration 330 when the user requests to focus in on the analytics for a single fluid filter 16 that is of interest to the user.

Wireless communication may occur via one or more networks 340 such as the internet. In some embodiments of the present invention, the network 340 may include one or more wide area networks (WAN) or local area networks (LAN). The network may utilize one or more network technologies such as Ethernet, FastEthernet, Gigabit Ethernet, virtual private network (VPN), remote VPN access, a variant of IEEE 802.11 standard such as Wi-Fi, and the like. Communication over the network 340 takes place using one or more network communication protocols including reliable streaming protocols such as transmission control protocol (TCP). These examples are illustrative and not intended to limit the present invention. Wired connection communication may occur with but is not limited to a fiber optic connection, a coaxial cable connection, a copper cable connection, and/or any other direct wired connection that will be apparent from those skilled in the relevant art(s) without departing from the spirit and scope of the present disclosure.

As noted above, the filter monitoring device 32 may monitor different characteristics of the fluid flow for the fluid power system 10, particularly characteristics of the fluid flow in the fluid filter 32 that may be related to the particle absorption level of the fluid filter 16. The filter monitoring device 32 may then provide filter data generated from the monitoring of the characteristics of the filter flow by the filter monitoring device 32 to the filter computing device 310. The filter data is a significant amount of data generated from the monitoring of the characteristics of the fluid flow over time that is incorporated by the filter computing device 310 to determine different types of analytics for the fluid filter 16. For example, the filter data includes the pressure change of the fluid as monitored by the filter monitoring device 32 for the fluid filter 16 from when the fluid filter 16 was first commissioned to the current moment when the user is observing the performance of the fluid filter 16 as provided by the filter computing device 310.

Analytics of the fluid filter 16 that may be generated by the filter computing device 310 incorporate the filter data for each characteristic as monitored by the filter monitoring device 32 and from the filter data to provide insight to the performance of the fluid filter 16 that is easily understood by the user. The amount of filter data monitored by the filter monitoring device 32 and provided to the filter computing device 310 may be immense. For example, the fluid filter 16 may operate for significant portions of each day and may only be taken offline for short periods of time in a given year. Thus, the amount of fluid flowing through the fluid filter 16 may be significant as the pump 12 operates continuously for significant periods of time resulting in an immense amount of filter data for each characteristic that is monitored by the filter monitoring device 32.

Such an immense amount of filter data monitored by the filter monitoring device 32 and stored in the filter data server 320 may be extremely difficult for the user to parse through to obtain an assessment of the performance of the fluid filter 16. However, the filter computing device 310 may analyze the immense amount of filter data and provide meaningful analytics that provide insight as to the performance of the fluid filter 16 that are easily understood by the user. For example, the filter computing device 310 may generate an analytic that presents the characteristic of the pressure change of the fluid filter 16 to the user in an easily understandable manner. The pressure change of the fluid filter 16 may be an indicator as to the particle absorption level that the fluid filter 16 is experiencing. As the amount of pressure change increases, the likelihood that the particle absorption level of the fluid filter 16 is reaching the particle absorption saturation level also increases. Thus, the user may easily identify the performance status of the fluid filter 16 based on the pressure change of the fluid filter 16.

The filter computing device 310 may incorporate the fluid data as monitored by the filter monitoring device 32 for a particular characteristic of the fluid flow with regard to the fluid filter 16 into an analytic such as a visual graph that depicts how the characteristic of the fluid filter 16 deviates over an extended period of time. Rather than the user having to parse through an immense amount of filter data to assess the performance of the fluid filter 16, the filter computing device 310 incorporates the filter data into an easily understood visual graph that provides insight to the user with regards to the performance of the fluid filter 16.

Figure 3:
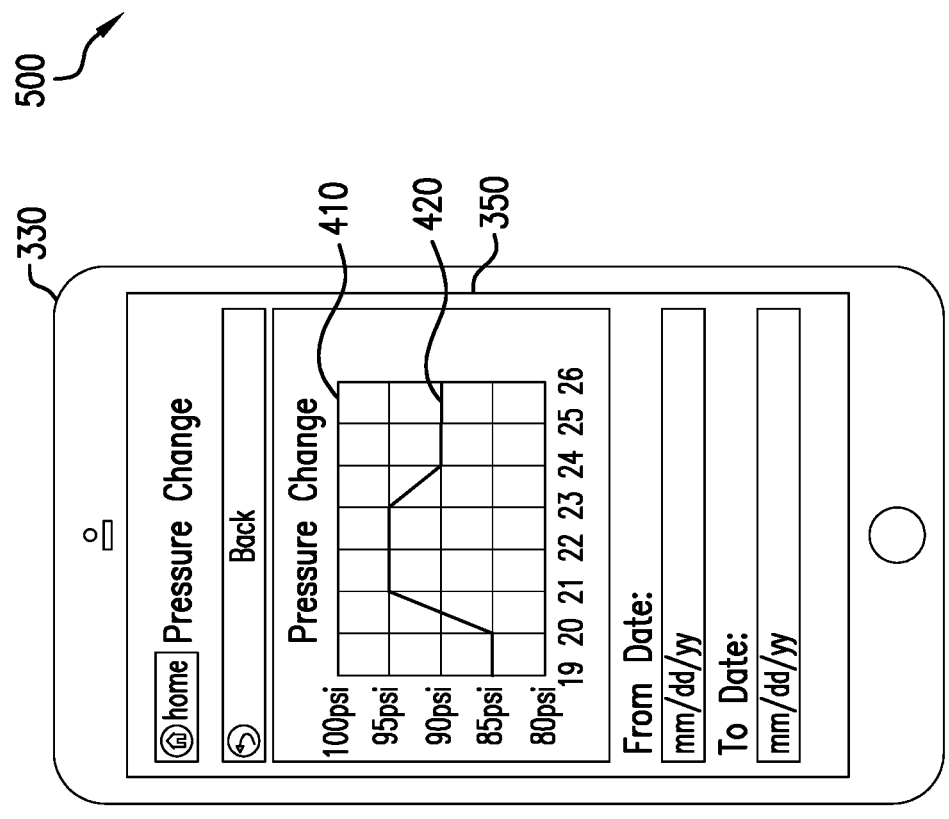
FIG. 3 is a schematic view of an example visual graph configuration in which the filter monitoring computing device displays a visual graph of the pressure difference via the user interface of the filter monitoring computing device according to one embodiment of the invention.

For example, FIG. 3 depicts an example visual graph configuration 400 in which the filter monitoring computing device 330 displays a visual graph of the pressure change of the fluid filter 16 via the user interface 350 of the filter monitoring computing device 310. As noted above, the pressure difference of the fluid filter 16 may provide meaningful insight as to the performance of the fluid filter 16. The pressure difference may be an indicator as to the particle absorption level of the fluid filter 16 at a given moment and/or period of time.

The example visual graph configuration 400 depicted in FIG. 3 depicts how the pressure change for the fluid filter 12 has deviated over a period of time. As can be seen in FIG. 3, user interface 350 of the filter monitoring computing device 330 depicts a visual graph 410 of the pressure difference as fluid flows through the fluid filter 16 over time. The pressure difference at a lower value on the plot 420 during the initial stages of the fluid filter 16 as the fluid filter 16 is initially installed into the fluid power system 10 and then continues to increase during the life of the fluid filter 16 as the fluid filter 16 continues to retain particles from the fluid as the fluid flows through the fluid filter 16. As the fluid filter 16 continues to retain particles in the mesh of pores, the pressure of the fluid continues to increase due to the increased resistance generated by the increase in the particles retained in the mesh of pores as the fluid attempts to push through the clogged mesh of pores. Thus, the increase in the pressure change of the fluid filter 16 is indicative to an increase in the particle absorption level of the fluid filter 16.

The visual graphs of characteristics and/or analytics of fluid flow that may be generated by the fluid computing device 310 may include but are not limited to pressure change, flow rate, volume, temperature, viscosity, thermal properties, Reynolds number and/or any other type of characteristic and/or analytic that may be an identifiable parameter of the fluid and/or indicator of the performance of the fluid filter 16 that will be apparent to those skilled in the relevant art(s) without departing from the spirit and scope of the disclosure.

The filter computing device 310 may generate an alert and provide that alert to the user via the filter monitoring computing device 330 when the specific characteristic exceeds or deviates below the designated threshold of the specific characteristic. Rather than requiring the user to monitor the visual graph for each characteristic and/or analyze other more complicated analytics generated by the filter computing device 310, the filter computing device 310 may generate an alert so the user is notified when any of the characteristics have exceeded and/or have deviated below the specified threshold for each characteristic. The user may then drill down further and request more detailed analytics but yet still be easily understandable, such as the visual graph of the failing characteristic, to gain further analysis of what has occurred with regards to the failing characteristic.

For example, the pressure change of the fluid filter 16 when initially being commissioned for the first time may have a pressure change of 85 PSI. As the fluid filter 16 continues to operate, the pressure change of the fluid filter 16 may start out at 85 PSI but may then continue to increase as the performance of the fluid filter 16 degrades and the quantity of particles retained by the fluid filter 16 increases. The saturation pressure change threshold for the pressure change when reached provides a significant indication that the performance of the fluid filter 16 has degraded to a point where the fluid filter 16 has reached the particle absorption saturation level and requires replacement. The filter computing device 310 then generates an alert to the user when the pressure change of the fluid filter reaches the saturation pressure change threshold of 95 PSI. As the saturation pressure change threshold is an indicator that the fluid filter 16 is experiencing the particle absorption saturation level and requires replacement.

The pressure change of the fluid filter 16 that is required to trigger the saturation pressure change threshold may be customized based on the fluid filter 16 as well as the fluid as well as the application of the fluid power system 10. For example, a fluid filter 16 that is incorporated into a gear box with a heavy oil may have a pressure change of 60 PSI in order to trigger the saturation pressure change threshold. However, a light oil in a turbine application may have a pressure change of 5 PSI in order to trigger the saturation pressure change threshold.

Further, the particle absorption level of the fluid filter 16 that is required to reach the particle absorption saturation level and thereby trigger the alert to replace the fluid filter 16 may also be customized based on the fluid filter 16 as well as the fluid as well as the application of the fluid power system 10. For example, the fluid filter 16 that is incorporated as a blood application may have a particle absorption saturation level when the fluid filter 16 is 60% clogged with particles due to the risk to the user should the fluid filter 16 fail to remove the particles from the blood. However, a fluid filter 16 filtering gear oils for a cement plant may have a particle absorption saturation level when the fluid filter is 99% clogged with particles as the risk to gears should the fluid filter 16 fail to remove the particles from the gears.

After the pressure change of the fluid filter 16 reaches the saturation pressure change threshold and has reached the particle absorption saturation level in that the fluid filter 16 may no longer retain particles from the fluid, the pressure change of the fluid filter 16 may plateau. As noted above, typically, the fluid filter 16 does not discharge the particles clogged in the mesh of pores to enable the fluid filter 16 to have a reduced particle absorption level to thereby continue to capture particles from the fluid. Rather, once the particle absorption saturation level is reached, the fluid filter 16 is no longer capable of retaining any additional particles thereby triggering the pressure change of the fluid filter 16 to plateau. For example, as shown in FIG. 3, the pressure change of the fluid filter 16 plateaus at 95 PSI once the pressure change increases to 95 PSI and reaches the saturation pressure change threshold such that the fluid filter 16 has reached the particle absorption saturation level and is no longer retaining particles from the fluid.

After the pressure change of fluid filter 16 plateaus at the saturation pressure change threshold, the fluid may continue to push to move through the fluid filter 16 to continue to flow through the fluid power system 10. Eventually, the fluid may continue to push until the fluid bypasses the fluid filter 16 and continues to flow through the fluid power system 10 without having to flow through the clogged fluid filter 16. Once that occurs, the pressure change of the fluid filter 16 may decrease significantly as the measurement of the pressure difference at the input port 110 and the output port 120 drops significantly due to the fluid bypassing the fluid filer 16. For example, as shown in FIG. 3, the pressure change of the fluid filter 16 decreases from 95 PSI after the pressure change plateaus at 95 PSI once the absorption saturation level is reached and decreases significantly to 90 PSI once the fluid bypasses the fluid filter 16.

Rather than simply determining that the fluid filter 16 is no longer at the particle absorption saturation level due to the pressure change decreasing from the saturation pressure change threshold and not generating an alert, the filter computing device 310 may continue to monitor the pressure change of the fluid filter 16 after the pressure change decreases for a period of time. As noted above, typically, the fluid filter 16 does not discharge particles to then be able to continue to absorb particles from the fluid. The decrease of the pressure change that extends for the period of time may be indicative that the fluid has bypassed the fluid filter 16. The filter computing device 310 may then determine whether the pressure change for the fluid filter decreases below a bypass pressure change for the period of time. The pressure change decreasing below the bypass pressure change threshold for the period of time is indicative that the particle absorption level for the fluid filter is at a particle absorption bypass level.

The filter computing device 310 may then generate the alert when the pressure change for the fluid filter 16 decreases below the bypass pressure change threshold for the period of time that is indicative that the particle absorption level for the fluid filter is at the particle absorption bypass level. The particle absorption bypass level is an indicator that the fluid is bypassing the fluid filter 16 and the fluid filter 16 is not retaining any additional particles as the fluid bypasses the fluid filter 16.

For example, FIG. 3 depicts that the pressure change for the fluid filter reaches the saturation pressure change threshold of 95 PSI and then plateaus at 95 PSI indicative that the fluid filter 16 has reached the particle absorption saturation level. The pressure change then decreases from 95 PSI to 90 PSI and continues to maintain at 90 PSI for 2 hours. The filter computing device 310 may recognize that the pressure change has decreased below a bypass pressure change threshold and has remained below the bypass pressure change threshold beyond the period of time of 1 hour. In doing so, the filter computing device 310 may recognize that the particle absorption level of the fluid filter 16 has reached the particle absorption bypass level and the fluid has thus bypassed the fluid filter 16. The filter computing device 310 may then generate the alert that the fluid is bypassing the fluid filter 16 and that the fluid filter 16 requires to be replaced.

In an embodiment, the filter computing device 310 may determine whether the pressure change for the fluid filter increases above the saturation pressure change threshold and then decreases below the saturation pressure change threshold. The transition in the pressure change from increasing above the saturation pressure change threshold to decreasing below the saturation pressure change threshold is indicative that the particle absorption level for the fluid filter is at the particle absorption bypass level.

For example, FIG. 3 depicts that the saturation pressure change threshold is 90 PSI. The pressure change of the fluid filter 16 increases above the saturation pressure change threshold of 90 PSI and plateaus indicating that the fluid filter 16 has reached the particle absorption saturation level. The pressure change then decreases back to the saturation pressure change threshold of 90 PSI. The filter computing device 310 may determine that the increase of the pressure change to above the saturation pressure change threshold of 90 PSI and then the decrease of the pressure change to the saturation pressure change threshold of 90 PSI that the fluid has bypassed the fluid filter 16. The filter computing device 310 may then generate the alert that the fluid has bypassed the fluid filter 16.

The filter computing device 310 may simplify the analytics with regards to the fluid flow of the fluid filter 16 even further from the visual graph while still providing the user with insight as to the performance of the fluid filter 16 that is easily understood. As mentioned above, the user may be responsible for monitoring numerous fluid filters 16 included in the filter computing configuration 300, such as a factory that includes numerous fluid filters 16. The user may also be responsible for many other facets of the factory in addition to the fluid filter 16 and/or numerous other fluid filters 16 and may not be able to routinely analyze easily understood analytics such as the visual graph and/or other easily understood analytics generated by the filter computing device 310.

Thus, the filter computing device 310 may simply provide the status of the fluid filter 16 with regards to different characteristics of the fluid flow based on a threshold for each of the different characteristics. The filter computing device 310 may monitor each of the different characteristics to determine whether any of the different characteristics exceeds or deviates below a threshold for the fluid filter 16. The threshold for each of the different characteristics may be customized for each specific characteristic. Each threshold may be based on a level in which the specific characteristic exceeds or deviates below and thus provides a significant indication that the performance of the fluid filter 16 is degrading and requires the attention of the user.

Figure 4:
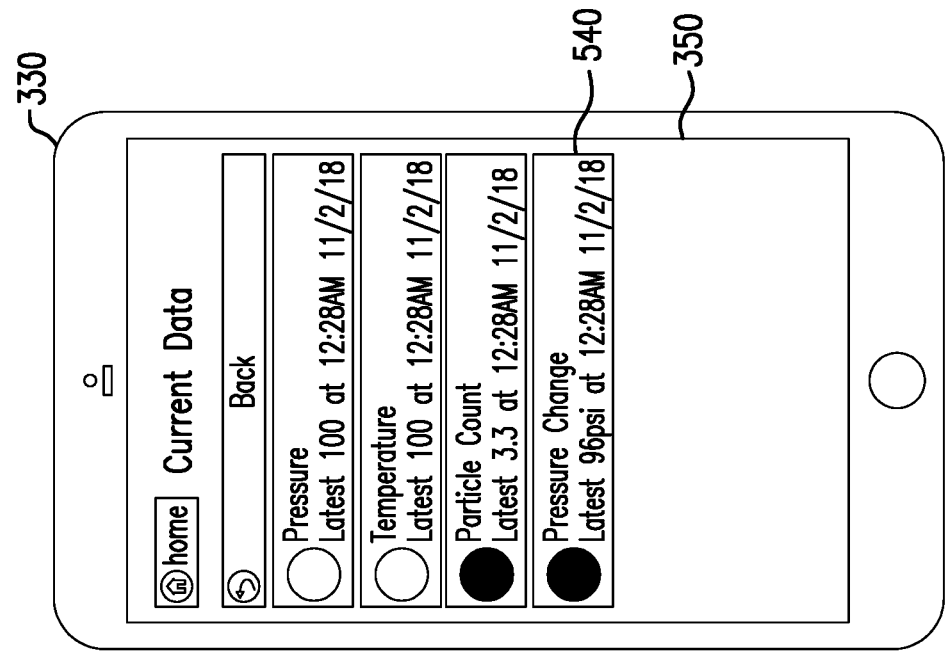
FIG. 4 is a schematic view of an example threshold alert configuration in which the filter monitoring computing device displays a status of several characteristics of the fluid flow with regards to whether the characteristics have exceeded or deviated below their respective thresholds via the user interface according to one embodiment of the invention.

For example, FIG. 4 depicts an example threshold alert configuration 500 in which the fluid monitoring computing device 330 displays a status of several characteristics of the fluid flow with regards to whether the characteristics have exceeded or deviated below their respective thresholds via the user interface 350. The filter computing device 310 may stream the status of each of the characteristics of the fluid filter 16 via the network 340. The status of each of the characteristics may then be displayed by the fluid computing device 310 via the user interface 350.

The filter monitoring computing device 330 may depict each of the statuses by an easily recognizable identifier. With regards to the example threshold alert configuration 500 in FIG. 4, the filter monitoring computing device 330 displays each of the statuses via the user interface 350 via two different colors. The filter monitoring computing device 330 depicts the status of characteristic that has not exceeded or deviated below its respective threshold with the status identifier of "green" in which the color "green" is a status that is universally recognized there is no concern. The filter monitoring computing device 330 depicts the status of the characteristic that has exceeded or deviated below its respective threshold and generates an alert with the status identifier of "red" in which the color "red" is a status that is universally recognized as there is cause for concern.

The example threshold alert configuration 500 in FIG. 4, also provides the status of the characteristic of the pressure change of the fluid flow of the fluid filter 16. The fluid computing device 310 may stream to the filter monitoring computing device 330 the status of the pressure change of the fluid filter 16 with regards to whether the pressure change of the fluid filter 16 has exceeded the saturation pressure change threshold and the filter monitoring computing device 330 may display that status via the status pressure change indicator 540. As the pressure change of the fluid filter increases and continues to be at an increased level over a period of time, such an increase may be indicative that the particle absorption level of the fluid pump 16 is increasing and that the particle absorption saturation level of the fluid pump 16 may be approaching and that replacement of the fluid pump 16 is required.

Thus, the filter computing device 310 determines whether the pressure change of the fluid filter 16 has reached the saturation pressure change threshold, and if so, streams to the filter monitoring computing device 330 an alert that the pressure change has exceeded the saturation pressure change threshold. The filter monitoring computing device 330 then displays the pressure change status indicator 540 as "green" when the pressure change remains below the saturation pressure change threshold and then displays the pressure change status indicator 540 as "red" as an alert when the pressure change reaches the saturation pressure change threshold. The filter computing device 310 may also stream filter data associated with the fluid flow of the fluid filter 16 to the filter monitoring computing device 330 that the filter monitoring computing device 330 may display. For example, example threshold alert configuration 500 in FIG. 4, displays that the latest pressure change measurement is 95PSI and was measured at 12:28 AM on Nov. 2, 2018.

In doing so, the filter computing device 310 may alert the user via the filter monitoring computing device 330 once the pressure change of the fluid filter 16 reaches the saturation pressure change threshold. Rather than having maintenance teams replace the fluid filter 16 on scheduled intervals that may prematurely remove the fluid filter 16 before the fluid filter reaches the saturation pressure change threshold and/or have the fluid filter 16 remain in the fluid power system 10 well beyond the saturation pressure change threshold, the filter computing device 310 may alert the user via the filter monitoring computing device 330 once the pressure change of the fluid filter 16 reaches the saturation pressure change threshold. The user may then replace the fluid filter 16 when the fluid filter 16 reaches the particle absorption saturation level thereby ensuring that the fluid filter 16 is used up until the point where the fluid filter 16 may no longer retain particles from the fluid while also ensuring that the fluid filter 16 is removed before no longer retaining particles from the fluid.

The filter computing device 310 may alert several different users that may have interest when the pressure change of the fluid filter 16 reaches the saturation pressure change threshold. For example, the filter computing device 310 may alert the maintenance manager via the filter monitoring computing device 330 of the maintenance manager as the maintenance manager is responsible for removing the fluid filter 16 when the pressure change of the fluid filter 16 reaches the saturation pressure change threshold. The filter computing device 310 may alert the purchase department via the filter monitoring computing device 330 of the purchase department as the purchase department is responsible for ordering a new fluid filter to replace the fluid filter 16 when the pressure change of the fluid filter 16 reaches the saturation pressure change threshold.

The filter computing device 310 may alert the new order supply chain of the fluid filter distributor via the filter monitoring computing device 330 of the fluid filter distributor as the fluid filter distributor is responsible for shipping a new fluid filter to replace the fluid filter 16 when the pressure change of the fluid filter 16 reaches the saturation pressure change threshold. The filter computing device 310 may alert the sales person of the fluid filter distributor via the filter monitoring computing device 330 as the sales person is responsible for maintaining the relationship between the fluid filter distributor and the maintenance team when the fluid filter 16 reaches the saturation pressure threshold.

The filter computing device 310 may alert any user that has an interest in the replacement of the fluid filter 16 via the corresponding filter monitoring computing device 330 when the pressure change of the fluid filter 16 reaches the saturation pressure change threshold that will be apparent to those skilled in the relevant art(s) without departing from the spirit and scope of the disclosure. The filter computing device 310 may generate the alert to be displayed to the user via the filter monitoring computing device 330 via Short Message Service (SMS) messaging, electronic mail, short range wireless communications, Multimedia Messaging Service (MMS) messaging, an Application Programming Interface (API) call and/or any other suitable communication approach that will be apparent to those skilled in the relevant art(s) without departing from the spirit and scope of the present disclosure.

Each time that the filter computing device 310 generates the alert that the pressure change for the fluid filter 16 has reached the saturation pressure change threshold, the filter computing device 310 may also generate filter data associated with the life of the fluid filter 16 from when the fluid filter 16 was first installed in the fluid power system 10 up through when the pressure change of the fluid filter 16 reached the saturation pressure change threshold. For example, the filter computing device 310 may generate filter data and provide the filter data to the user via the filter monitoring computing device 330 that depicts when the fluid filter 16 was initially ordered, the length of time that the fluid filter 16 lasted between initially being installed and then having the pressure change reach the saturation pressure change threshold, and/or any other additional performance based filter data that may be useful to the user that will be apparent to those skilled in the relevant art(s) without departing from the spirit and scope of the present disclosure.

Further, each time that the fluid filter 16 is replaced, the filter computing device 310 may record the date that the fluid filter 16 is replaced as well as recording the filter data associated with the fluid filter 16 at the date that the fluid filter 16 is replaced. For example, the filter computing device 310 may record the pressure change of the fluid filter 16 when the fluid filter 16 is replaced. Filter computing device 310 may then forecast a date that the new fluid filter 16 is to be replaced based on when the previous fluid filter 16 is replaced as well as forecast a pressure change that when reached by the new fluid filter may be indicative that the new fluid filter is to be replaced.

In an embodiment, the filter computing device 310 may generate the alert and provide the alert to an Enterprise Resource Planning (ERP) system of the maintenance team that is responsible for replacing the fluid filter 16 when the pressure change of the fluid filter 16 reaches the saturation pressure change threshold. In doing so, the filter computing device 310 may automatically alert the ERP that the fluid filter 16 has reached the particle absorption saturation level and requires replacement. The ERP may then automatically generate an order for a new fluid filter to replace the fluid filter 16 that has reached the particle absorption saturation level and provide the order to the fluid filter distributor. The fluid filter distributor may then ship the new fluid filter such that the fluid filter 16 that has reached the particle absorption saturation level may be replaced without a disruption in down time for the fluid power system 10.

In an embodiment, the filter computing device 310 may monitor a particle count of the fluid as the fluid flows through the fluid filter 16. The particle count of the fluid is a quantity of particles that flow through the fluid filter 16 along the flow path. As the fluid flows through the fluid power system 10, the fluid may continue to accumulate particles. The fluid filter 16 may remove the particles that accumulate in the fluid. Regardless, the filter computing device 310 may monitor the particle count of the fluid to determine whether the particle count of the fluid continues to increase. In doing so, the filter computing device 310 may monitor the particle count in real-time such that as the fluid flows through the fluid power system 10, the filter computing device 310 may continuously determine the particle count of the fluid regardless as to whether the fluid filter 16 is removing the particles from the fluid.

The filter computing device 310 may then determine when the particle count of the fluid flowing through the fluid filter 16 is at a particle count level that is indicative that the particle count of the fluid that is flowing through the fluid filter is increasing. In doing so, the filter computing device 310 may identify when the particle count of the fluid is increasing in real-time regardless as to whether the fluid filter 16 is removing the particles from the fluid. The filter computing device 310 may then generate an alert when the particle counts of the fluid flowing through the fluid filter 16 is above the particle count level and the pressure change of the fluid filter 16 is below the saturation pressure change threshold. The particle count being above the particle count level and the pressure change being below the saturation pressure change threshold is indicative that the particle count of the fluid is increasing and impacting the particle absorption level of the fluid filter 16 thereby triggering an increase in the particle absorption level of the fluid filter 16. In doing so, the filter computing device 310 may preemptively identify in real-time that the particle count of the fluid is increasing despite the fluid filter 16 having a particle absorption level that has yet to reach the particle absorption saturation level.

In addition to generating an alert when the pressure change of the fluid filter 16 reaches the saturation pressure change threshold, the filter computing device 310 may also forecast when the fluid filter 16 may reach the saturation pressure change threshold. The filter computing device 310 may continuously monitor the pressure change as the fluid flows through the fluid filter 16. The filter computing device 310 may then forecast a prediction date that the absorption level of the fluid filter 16 is to exceed the particle absorption saturation level based on the pressure change of the fluid as the fluid flows through the fluid filter 16 is continuously monitored.

As the fluid continuously flows through the fluid filter 16, the filter computing device 310 may continuously monitor the pressure change of the fluid. As the pressure change continues to increase over time as the fluid flows through the fluid filter 16, the filter computing device 310 may forecast the prediction date that the fluid filter 16 is to exceed the particle absorption saturation level based on the increase of the pressure change of the fluid filter 16 over a period of time. The filter computing device 310 may then generate an alert to indicate the prediction date that the particle absorption level of the fluid filter 16 is to exceed the particle absorption saturation level.

The filter computing device 310 may determine a rate of increase of the pressure change as the fluid flows through the fluid filter 16 for a period of time as the pressure change of the fluid as the fluid that flows through the fluid filter 16 is continuously monitored. For example, the filter computing device 310 may monitor the rate of increase of the pressure change as the fluid flows through the fluid filter over a period of one-day intervals. After each one-day interval, the filter computing device 310 may determine the rate of increase for the pressure change for that one-day interval. The filter computing device 310 may then compare the rate of increase in the pressure change for that one-day interval to each previously determined rate of increase in the pressure change for each previous one-day interval.

The filter computing device 310 may then forecast the prediction date that the particle absorption level of the fluid filter 16 is to exceed the particle absorption saturation level based on the rate of increase of the pressure change as the fluid flows through the fluid filter 16 for the period of time. In such an example, the filter computing device 310 may then forecast the prediction date that the particle absorption level of the fluid filter 16 is to exceed the particle absorption saturation level based on each rate of increase in the pressure change for each one-day interval. The filter computing device 310 may continue to refine the forecast of the prediction date as the filter computing device continues to determine the rate of increase for the pressure change for each one-day interval over the lifetime of the fluid filter 16.

Returning to FIG. 2, a neural network 260 may assist the filter computing device 310 in forecasting the prediction date that the particle absorption level of the fluid filter 16 is to exceed the particle absorption saturation level. The filter computing device 310 may accumulate the pressure change of the fluid as the fluid continuously flows through each fluid filter 16 that replaces each previous fluid filter with the particle absorption level that exceeded the particle absorption saturation level. As each fluid filter 16 is positioned in the fluid power system 10, the filter computing device 310 may accumulate the pressure change of the fluid as the fluid continuously flows through each fluid filter 16 thereby continuously accumulating the pressure change for each fluid filter that is positioned in the fluid power system 10. In accumulating the pressure change of the fluid as the fluid continuously flows through each fluid filter 16 that is positioned into the fluid power system 10, such an accumulation of the pressure change may be stored in filter data server 320.

The filter computing device 310 may then determine a pressure change failure level for each fluid filter 16 triggered when the particle absorption level for each fluid filter 16 exceeds the particle absorption level. The pressure change level is a pressure change of the fluid that triggers the particle absorption level for each fluid filter 16 to exceed the particle absorption saturation level. The accumulation of the pressure change of the fluid as the fluid continuously flows through each fluid filter 16 that is positioned in the fluid power system 10 that is stored in the filter data server 320 may then be applied to the neural network 260. The neural network 260 may apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure.

In doing so, the neural network 260 may then assist the filter computing device 310 in forecasting the prediction date that the particle absorption level of the fluid filter 16 is to exceed the particle absorption saturation level based on the accumulated pressure change of the fluid as the fluid continuously flows through each fluid filter 16 that replaces each previous fluid filter and each corresponding pressure change failure level for each fluid filter 16 triggered when the particle absorption level for each fluid filter 16 exceeds the particle absorption saturation level.

Each time that the pressure change of the fluid as the fluid continuously flows through fluid filter 16 that is positioned in the fluid power system 10, the neural network 260 may continue to accumulate each of the monitored pressure changes to further improve the accuracy of the filter computing device 310 in determining the pressure change failure level for each fluid filter 16. In doing so, the neural network 260 may provide the forecast of the prediction date that the particle absorption level of the fluid filter 16 is to exceed the particle absorption saturation level to the filter computing device 310 and the filter computing device 310 may generate the prediction date with increased accuracy as the pressure change of the fluid as the fluid continues to flow through each fluid filter 16 is accumulated. The filter computing device 310 may then continue to learn upon each time that the fluid filter 16 reaches the particle absorption saturation level.

The neural network 260 may also assist the filter computing device 310 in determining an appropriate fluid filter that should be incorporated into the fluid power system 10. Even though a specific fluid filter may already be positioned in the fluid power system 10 and is continued to be replaced with identical fluid filters, the neural network 260 may assist the filter computing device 310 in evaluating whether that specific fluid filter is the appropriate fluid filter to be positioned in the fluid power system 10. The filter data of each fluid filter positioned in the fluid power system 10 may be continuously accumulated as the fluid flows through each fluid filter and stored in the filter data server 320. The filter data may include but is not limited to the pressure change of the fluid as the fluid flows through each fluid filter, the particle count of the fluid, the specifications of each fluid filter such as pore size, surface area, and/or any other type filter data that may assist in the evaluation of the fluid filter that will be apparent to those skilled in the relevant art(s) without departing from the spirit and scope of the disclosure.

As the neural network 260 learns with the filter data that is continuously accumulated as the fluid flows through each fluid filter, the neural network 260 may assist the filter computing device 310 in evaluating the appropriate fluid filter that should be positioned in the fluid power system 10 in order to optimize the removal of particles from the fluid. The accumulation of filter data such as the pressure change, the particle count, the pore size of the fluid filter, the surface area of the fluid filter and so on may enable the neural network 260 to learn and evaluate the appropriate fluid filter for the fluid power system 10.

For example, a fluid filter 16 that have increased pore sizes typically have an increased lifetime in which the fluid filter 16 may operate in the fluid power system 10 without having the particle absorption level of the fluid filter 16 reaching the particle absorption saturation level. However, such a fluid filter 16 with increased pore size and increased lifetime may capture lower quantities of particles as compared to a fluid filter 16 with decreased pore sizes but has a decrease in lifetime. Through the accumulation of filter data as the fluid continuously flows through each fluid filter as well as the specifications of each fluid filter, the neural network 260 may learn as to the appropriate fluid filter with the appropriate pore size as well as the appropriate lifetime to determine the optimal fluid filter to be positioned into the fluid power system 10 with the specific operating conditions of the fluid power system 10 as well as the fluid flowing through the fluid power system 10 as well as the objectives of the performance of the fluid power system 10. The accuracy in which the filter computing device 310 may determine the appropriate fluid filter to be incorporated into the fluid power system 10 may continue to increase as filter data is continuously accumulated.

Figure 5:
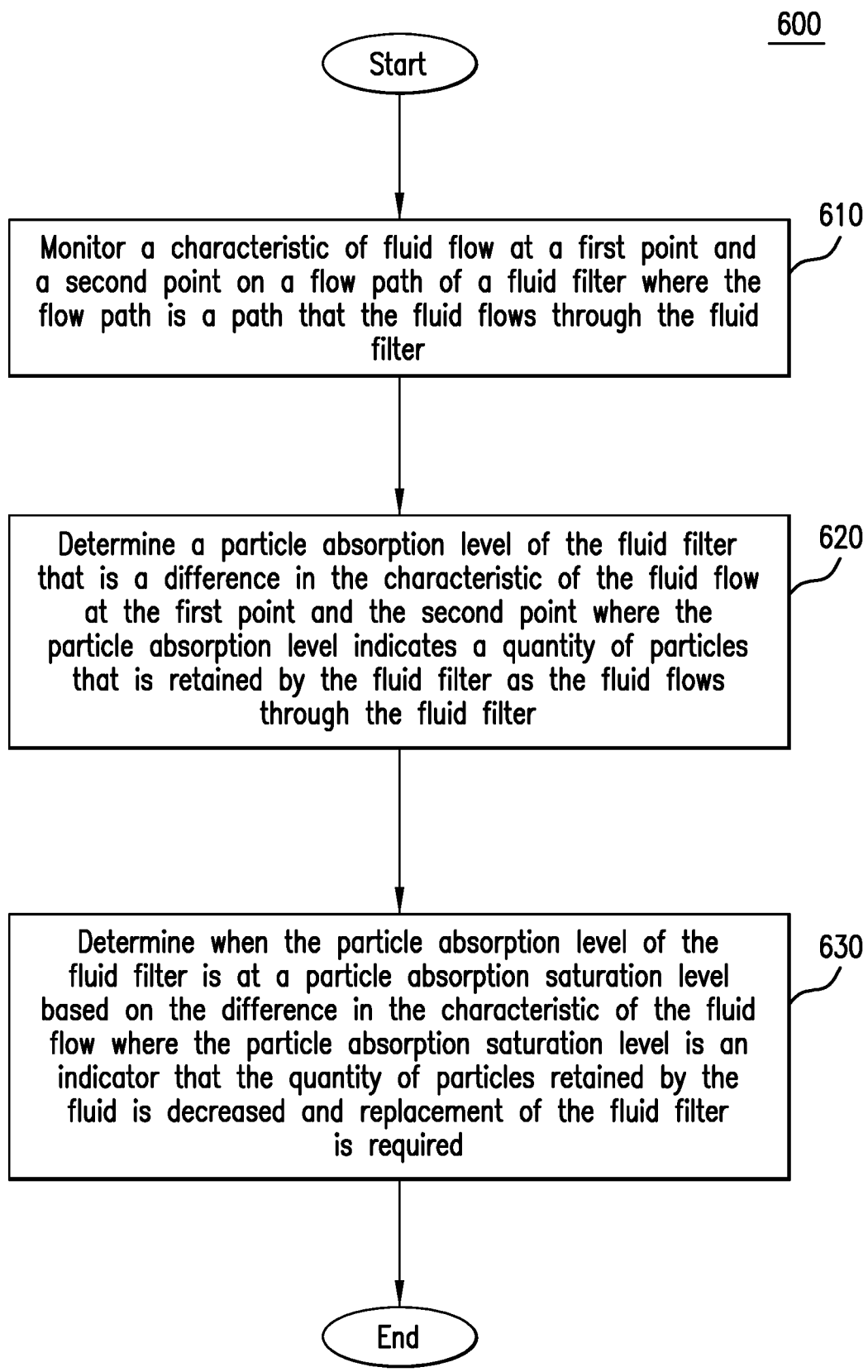
FIG. 5 is a flowchart of an exemplary process for determining filter efficiency of a fluid filter according to one embodiment of the invention.

Referring now to FIG. 5, a flowchart is presented showing an exemplary process 600 for determining a filter efficiency of a pump. As shown in FIG. 5, process 600 begins at step 610, when a characteristic of fluid flow of a fluid is monitored at a first point and a second point on a flow path of fluid filter. The flow path is a path that the fluid flows through the fluid filter. For example, as shown in FIG. 1, the filter monitoring device 32 may monitor a characteristic of fluid flow of a fluid, such as the pressure difference of the fluid at a first point and at a second point on a flow path of the fluid filter 16. The flow path is a path that the fluid flows through the fluid filter 16, such from the input port 110 through the fluid filter 16 and through the output port 120. As the characteristic of the fluid flow is monitored, the system may proceed to step 620 of process 600.

At step 620 of process 600, a particle absorption level of the fluid filter that is a difference in the characteristic of the fluid flow at the first point and the second point is determined. The particle absorption level indicates a quantity of particles that is retained by the fluid filter as the fluid flows through the fluid filter along the flow path. For example, as shown in FIG. 2, the filter computing device 310 determines a particle absorption level for the fluid filter 16 based on the pressure difference of the fluid between the input port 110 and the output port 120 as fluid flows through the fluid filter 16. The system may then proceed to step 630 of process 600.

At step 630 of process 600, when the particle absorption level of the fluid filter is at a particle absorption saturation level is determined based on the difference in the characteristic of the fluid flow at the first point and the second point. The particle absorption saturation level is an indicator that the quantity of particles retained by the fluid filter as the fluid flows through the fluid filter is decreased and replacement of the fluid filter is required to increase the quantity of particles retained by the fluid filter to be above the particle absorption saturation level. For example, the filter computing device 310 determines when the particle absorption level of the fluid filter 16 is at the particle absorption saturation level based on the pressure change of the fluid at the input port 110 and the output port 120 as the fluid flows through the fluid filter 16. The particle absorption saturation level is reached when the pressure change of the fluid increases to a threshold that is indicative that the fluid filter 16 is no longer removing particles from the fluid as the mesh of pores of the fluid filter 16 is clogged.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination.

Additional advantages and modifications will readily appear to those skilled in the art. The invention in its broader aspects is therefore not limited to the specific details and representative devices shown and described. Accordingly, departures may be made from such details without departing from the scope of the general inventive concept.

What is claimed is:

1. A computer implemented method for determining a filter efficiency of a fluid filter, comprising:
    monitoring a pressure change of fluid flow of a fluid at a first point and at a second point on a flow path of a fluid filter for a period of time, wherein the flow path is a path that the fluid flows through the fluid filter and the pressure change is an indicator of a particle absorption level of the fluid filter;
    determining a particle absorption level of the fluid filter that is a pressure change of the fluid flow at the first point and the second point, wherein the particle absorption level indicates a quantity of particles that is retained by the fluid filter as the fluid flows through the fluid filter along the flow path;
    determining when the particle absorption level of the fluid filter is at a particle absorption saturation level based on the pressure change of the fluid flow at the first point and the second point, wherein the particle absorption saturation level is an indicator that the quantity of particles retained by the fluid filter as the fluid flows through the fluid filter is decreased and replacement of the fluid filter is required to increase the quantity of particles retained by the fluid filter to be above the particle absorption saturation level;
    determining whether the pressure change for the fluid filter decreases below a bypass pressure change threshold for the period of time, wherein the pressure change decreasing below the bypass pressure change threshold for the period of time is indicative that the particle absorption level for the fluid filter is at a particle absorption bypass level; and
    generating an alert when the pressure change for the fluid filter decreases below the bypass pressure change threshold for the period of time that is indicative that the particle absorption level for the fluid filter is at the particle absorption bypass level, wherein the particle absorption bypass level is an indicator that the fluid is bypassing the fluid filter and the fluid filter is not retaining any additional particles as the fluid bypasses the fluid filter.

2. The computer implemented method of claim 1, further comprising:
    determining whether the pressure change for the fluid filter increases above the saturation pressure change threshold and decreases below the saturation pressure change threshold, wherein the transition in the pressure change from increasing above the saturation pressure change threshold to decreasing below the saturation pressure change threshold is indicative that the particle absorption level for the fluid filter is at the particle absorption bypass level; and
    generating the alert when the pressure change for the fluid filter increases above the saturation pressure change threshold and decreases below the saturation pressure change threshold that is indicative that the particle absorption level for the fluid filter is at the particle absorption bypass level.

3. The computer implemented method of claim 1, further comprising:
    generating a visual graph that depicts how the pressure change deviates for the fluid filter over an extended period of time.

4. The computer implemented method of claim 1, further comprising:
    monitoring a pressure change of fluid flow of the fluid at the first point and at the second point on the flow path of the fluid filter, wherein the pressure change of the fluid flow is an indicator of the particle absorption level of the fluid filter;
    determining the particle absorption level of the fluid filter that is the pressure change of the fluid flow at the first point and the second point, wherein the particle absorption level indicates a quantity of particles that is retained by the fluid filter as the fluid flows through the fluid filter along the flow path; and
    determining when the particle absorption level of the fluid filter is at the particle absorption saturation level based on the pressure change of the fluid flow at the first point and the second point, wherein the particle absorption saturation level of the fluid filter is reached when the pressure change of the fluid flow exceeds a saturation pressure change threshold and is an indicator that the quantity of particles retained by the fluid filter as the fluid flows through the fluid filter is decreased and replacement of the fluid filter is required to increase the quantity of particles retained by the fluid filter to be above the particle absorption saturation level.

5. The computer implemented method of claim 4, further comprising:
    generating an alert when the pressure change for the fluid filter is above the saturation pressure change threshold, wherein the saturation pressure change threshold is an indicator that the fluid filter is experiencing the particle absorption saturation level.

6. The computer implemented method of claim 5, further comprising:
    monitoring a particle count of the fluid as the fluid flows through the fluid filter, wherein the particle count of the fluid is a quantity of particles that flow through the fluid filter along the flow path;
    determining when the particle count of the fluid flowing through the fluid filter is at a particle count level that is indicative that the particle count of the fluid that is flowing through the fluid filter is increasing;
    generating an alert when the particle count of the fluid flowing through the fluid filter is above the particle count level and the pressure change for the fluid filter is below the saturation pressure change threshold, wherein the particle count is above the particle count level and the pressure change is below the saturation pressure change threshold is indicative that the particle count of the fluid is increasing and impacting the particle absorption level of the fluid filter triggering an increase in the particle absorption level.

7. The computer implemented method of claim 5, further comprising:
continuously monitoring the pressure change as the fluid flows through the fluid filter;
forecasting a prediction date that the particle absorption level of the fluid filter is to exceed the particle absorption saturation level based on the pressure change as the pressure change of the fluid as the fluid flows through the filter is continuously monitored; and
generating an alert to indicate the prediction date that the particle absorption level of the fluid filter is to exceed the particle absorption saturation level.

8. The computer implemented method of claim 7, further comprising:
determining a rate of increase of the pressure change as the fluid flows through the fluid filter for a period of time as the pressure change of the fluid as the fluid flows through the fluid filter is continuously monitored; and
forecasting the prediction date that the particle absorption level of the fluid filter is to exceed the particle absorption saturation level based on the rate of increase of the pressure change as the fluid flows through the filter for the period of time.

9. The computer implemented method of claim 8, further comprising:
accumulating the pressure change of the fluid as the fluid continuously flows through each filter that replaces each previous filter with the particle absorption level that exceeded the particle absorption saturation level;
determining a pressure change failure level for each filter triggered when the particle absorption level for each filter exceeds the particle absorption saturation level, wherein the pressure change failure level is a pressure change of the fluid that triggers the particle absorption level for each filter to exceed the particle absorption saturation level; and
forecasting the prediction date that the particle absorption level of the fluid filter is to exceed the particle absorption saturation level based on the accumulated pressure change of the fluid as the fluid continuously flows through each filter that replaces each previous filter and each corresponding pressure change failure level for each filter triggered when the absorption level for each filter exceeds the particle absorption saturation level.

10. A system for determining a filter efficiency of a fluid filter, comprising:
a filter monitoring device configured to monitor a pressure change of fluid flow of a fluid at a first point and at a second point on a flow path of a fluid filter for a period of time, wherein the flow path is a path that the fluid flows through the fluid filter and the pressure change is an indicator of a particle absorption level of the fluid filter; and
a filter computing device configured to:
determine a particle absorption level of the fluid filter that is a pressure change of the fluid flow at the first point and the second point, wherein the particle absorption level indicates a quantity of particles that is retained by the fluid filter as the fluid flows through the fluid filter along the flow path,
determine when the particle absorption level of the fluid filter is at a particle absorption saturation level based on the pressure change of the fluid flow at the first point and the second point, wherein the particle absorption saturation level is an indicator that the quantity of particles retained by the fluid filter as the fluid flows through the fluid filter is decreased and replacement of the fluid filter is required to increase the quantity of the particles retained by the fluid filter to be above the particle absorption saturation level,
determine whether the pressure change for the fluid filter decreases below a bypass pressure change threshold for the period of time, wherein the pressure change decreasing below the bypass pressure change threshold for the period of time is indicative that the particle absorption level for the fluid filter is at a particle absorption bypass level, and
generate an alert when the pressure change for the fluid filter decreases below the bypass pressure change threshold for the period of time that is indicative that the particle absorption level for the fluid filter is at the particle absorption bypass level, wherein the particle absorption bypass level is an indicator that the fluid is bypassing the fluid filter and the fluid filter is not retaining any additional particles as the fluid bypasses the fluid filter.

11. The system of claim 10, wherein the filter computing device is further configured to:
determine the particle absorption level of the fluid filter that is the pressure change of the fluid flow at the first point and the second point, wherein the particle absorption level indicates a quantity of particles that is retained by the fluid filter as the fluid flows through the fluid filter along the flow path; and
determine when the particle absorption level of the fluid filter is at the particle absorption saturation level based on the pressure change of the fluid flow at the first point and the second point, wherein the particle absorption saturation level of the fluid filter is reached when the pressure change of the fluid flow exceeds a saturation pressure change threshold and is an indicator that the quantity of particles retained by the fluid filter as the fluid flows through the fluid filter is decreased and replacement of the fluid filter is required to increase the quantity of particles retained by the fluid filter to be above the particle absorption saturation level.

12. The system of claim 11, wherein the filter computing device is further configured to:
generate an alert when the pressure change for the fluid filter is above the saturation pressure change threshold, wherein the saturation pressure change threshold is an indicator that the fluid filter is experiencing the particle absorption saturation level.

13. The system of claim 12, wherein the filter monitoring device is further configured to:
monitor a particle count of the fluid as the fluid flows through the fluid filter, wherein the particle count of the fluid is a quantity of particles that flow through the fluid filter along the flow path.

14. The system of claim 13, wherein the filter computing device is further configured to:
determine when the particle count of the fluid flowing through the fluid filter is a particle count level that is indicative that the particle count of the fluid that is flowing through the fluid filter is increasing;

generate an alert when the particle count of the fluid flowing through the fluid filter is above the particle count level and the pressure change for the fluid filter is below the saturation pressure change threshold, wherein the particle count is above the particle count level and the pressure change is below the saturation pressure change threshold is indicative that the particle count of the fluid is increasing and impacting the particle absorption level of the fluid filter triggering an increase in the particle absorption level.

15. The system of claim 12, wherein the filter monitoring device is further configured to continuously monitor the pressure change as the fluid flows through the fluid filter.

16. The system of claim 15, wherein the filter computing device is further configured to:
forecast a prediction date that the particle absorption level of the fluid filter is to exceed the particle absorption saturation level based on the pressure change as the pressure change of the fluid as the fluid flows through the filter is continuously monitored; and
generating an alert to indicate the prediction date that the particle absorption level of the fluid filter is to exceed the absorption saturation level.

17. The system of claim 16, wherein the filter computing device is further configured to:
determine a rate of increase of the pressure change as the fluid flows through the fluid filter for a period of time as the pressure change of the fluid as the fluid flows through the fluid filter is continuously monitored; and
forecast the prediction date that the particle absorption level of the fluid filter is to exceed the particle absorption saturation level based on the rate of increase of the pressure change as the fluid flows through the filter for the period of time.

18. The system of claim 17, wherein the filter computing device is further configured to:
accumulate the pressure change of the fluid as the fluid continuously flows through each filter that replaces each previous filter with the particle absorption level that exceeded the particle absorption saturation level;
determine a pressure change failure level for each filter triggered when the particle absorption level for each filter exceeds the particle absorption level, wherein the pressure change failure level is a pressure change of the fluid that triggers the particle absorption level for each filter to exceed the particle absorption saturation level; and
forecast the prediction date that the particle absorption level of the fluid filter is to exceed the particle absorption saturation level based on the accumulated pressure change of the fluid as the fluid continuously flows through each filter that replaces each previous filter and each corresponding pressure change failure level for each filter triggered when the absorption level for each filter exceeds the particle absorption level.

19. The system of claim 10, wherein the filter computing device is further configured to:
determine whether the pressure change for the fluid filter increases above the saturation pressure change threshold and decreases below the saturation pressure change threshold, wherein the transition in the pressure change from increasing above the saturation pressure change threshold to decreasing below the saturation pressure change threshold is indicative that the particle absorption level for the fluid filter is at the particle absorption bypass level; and
generate the alert when the pressure change for the fluid filter increases above the saturation pressure change threshold and decreases below the saturation pressure change threshold that is indicative that the particle absorption level for the fluid filter is at the particle absorption bypass level.

20. The system of claim 10, wherein the filter computing device is further configured to generate a visual graph that depicts how the pressure change deviates for the fluid filter over an extended period of time.

* * * * *